United States Patent
Lazalier et al.

(10) Patent No.: US 8,517,213 B2
(45) Date of Patent: *Aug. 27, 2013

(54) VENDING MACHINE USER INTERFACE GUIDE; ELECTRONIC COIN RETURN; AND HINGED DELIVERY BIN

(75) Inventors: Ray Melton Lazalier, Lake Saint Louis, MO (US); Jack Edward Anderson, St. Louis, MO (US); Martin Shawn Egan, Bridgeton, MO (US); David Aguirre, Springfield, MO (US); Gerald Joseph Podgorny, St. Louis, MO (US); Sachin Gopal Nagane, St. Charles, MO (US); Ignacio Santa Cruz, St. Louis, MO (US); Ronald Henry Krob, Jr., University City, MO (US)

(73) Assignee: Crane Merchandising Systems, Inc., Bridgeton, MO (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/533,791

(22) Filed: Jun. 26, 2012

(65) Prior Publication Data

US 2012/0273517 A1 Nov. 1, 2012

Related U.S. Application Data

(62) Division of application No. 12/544,911, filed on Aug. 20, 2009, now Pat. No. 8,205,770.

(60) Provisional application No. 61/189,647, filed on Aug. 21, 2008, provisional application No. 61/196,465, filed on Oct. 17, 2008.

(51) Int. Cl.
*A47F 1/00* (2006.01)

(52) U.S. Cl.
USPC ............ 221/100; 221/97; 221/125; 221/126; 221/282; 221/285

(58) Field of Classification Search
USPC .................... 221/100, 97, 282, 285, 125, 126
See application file for complete search history.

(56) References Cited

U.S. PATENT DOCUMENTS 8,205,770 B2 * 6/2012 Lazalier et al. ............... 221/100

* cited by examiner

Primary Examiner — Timothy Waggoner

(57) ABSTRACT

A system and method for directing a consumer through a vending machine transaction. The system and method include a UI guide comprising visual cues to direct a consumer to insert a minimum amount of money, make a production selection and confirm the product selection. The system and method provide for the consumer to cancel the transaction and request that return of inserted coins.

20 Claims, 8 Drawing Sheets

VENDING MACHINE USER INTERFACE GUIDE; ELECTRONIC COIN RETURN; AND HINGED DELIVERY BIN

CROSS-REFERENCE TO RELATED APPLICATION(S) AND CLAIM OF PRIORITY

The present application is a divisional of U.S. patent application Ser. No. 12/544,911, filed Aug. 20, 2009 now U.S. Pat. No. 8,205,770, entitled "VENDING MACHINE USER INTERFACE GUIDE; ELECTRONIC COIN RETURN; AND HINGED DELIVERY BIN," which claims priority to U.S. Provisional Patent Ser. No. 61/189,647, filed Aug. 21, 2008 and to U.S. Provisional Patent Ser. No. 61/196,465, filed Oct. 17, 2008, entitled "VENDING MACHINE USER INTERFACE GUIDE; ELECTRONIC COIN RETURN; AND HINGED DELIVERY BIN," The content of the above-identified patent documents is hereby incorporated by reference herein.

TECHNICAL FIELD

This disclosure is generally directed to consumer product vending machines and more particularly to systems and methods for interfaces for vending machines.

BACKGROUND

A vending machine is a machine that provides various snacks, beverages and other products to consumers by vending products without a cashier. Items sold via vending machines can vary by country and region. Vending machines typically utilize a push button interface that is capable of accepting money in paper or coin form. A consumer may insert coins into a coin acceptor or currency into a bill validator, or a combination of the two. Thereafter, the consumer typically makes a product selection by entering a product identifying code into a keypad on the face of the vending machine. If the amount of money recognized by the machine equals or exceeds the amount of money required to purchase the selected product, the machine proceeds to vend the product to the consumer. However, if the consumer has not entered enough money, or the machine not recognized the entry of enough money, no product will be vended to the consumer.

In some cases, coin acceptors jam up, especially if a bill or other foreign object is inserted into the coin slot. If the coin box is not cleared often enough, coins can fill up past the coin detector, preventing further purchases. Bill validators are also a source of frustration for many customers, especially when they falsely reject a bill that happens to be crumpled, ripped, or dirty.

The consumer may become frustrated or realize that he does not have enough money to make a purchase and choose to recover the money that the consumer previously has entered. The consumer may depress a "coin return" mechanism on the vending machine in an attempt to recover the money already entered. Further, the consumer may be required to depress the "coin return" mechanism repeatedly in order to properly engage the lever arms required to release the entered coins.

Additionally, vending machines require routine maintenance due to wear and as the result of vandalism. Often times, this maintenance is difficult due to the space limitations of the room where the vending machine is located.

SUMMARY

This disclosure provides a system and method for guiding a consumer through a vending machine transaction. This disclosure also provides a system and method for handling coin receiving and return in vending machine transactions. This disclosure also provides a system and method for accessing internal components of a vending machine. This disclosure also provides a system and method for wireless communication between and among vending machines and between vending machines and operational management and service controllers.

According to one embodiment of the present disclosure, a user interface guide directs a user through a vending machine transaction. A visual display provides LED cues that direct a customer to input a minimum monetary amount, make a product selection, confirm the product selection, or receive change or a return of the customer's money if so requested.

In still another embodiment, the present disclosure provides an electronically operated coin return. The coin receiving and return mechanism is responsive to an electronic actuator. When a customer selects a coin return button, a signal is sent to the electronic actuator to send the customer's coins to a coin return tray. Thereafter, the customer can be directed through a visual cue where to retrieve his/her money.

In yet another embodiment, the present disclosure provides an apparatus and method for configuring a delivery pan assembly to assist in reducing the amount of space required to access internal areas within the vending machine. The apparatus and method include a delivery pan assembly coupled to the vending machine via a hinge joint located at the bottom of the delivery pan assembly.

Other technical features may be readily apparent to one skilled in the art from the following figures, descriptions and claims.

BRIEF DESCRIPTION OF THE DRAWINGS

For a more complete understanding of this disclosure and its features, reference is now made to the following description, taken in conjunction with the accompanying drawings, in which.

DETAILED DESCRIPTION

The present disclosure provides a system and method guiding a consumer through a vending machine transaction. This disclosure also provides a system and method for handling coin receiving and return in vending machine transactions. This disclosure also provides a system and method for accessing internal components of a vending machine.

Figure 1A:
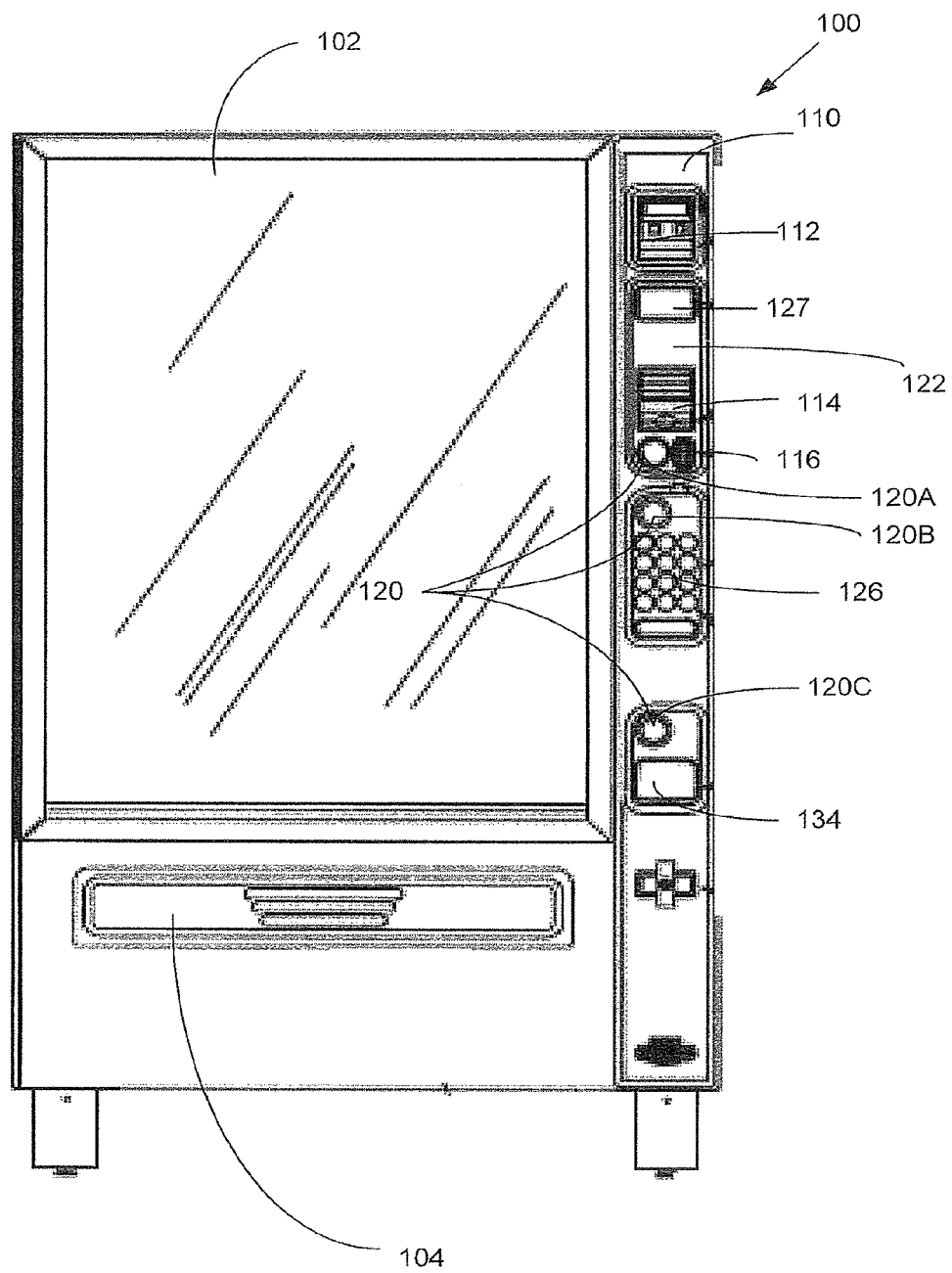
FIG. 1a is a somewhat simplified illustration of a vending machine according to one embodiment of the present disclosure.

FIG. 1a is a somewhat simplified illustration of a vending machine 100 according to one embodiment of the present disclosure. The vending machine has a product display and storage area 102 and a delivery door 104. Additionally, the vending machine 100 has a user interface area 110. Depiction of the user interface area 110 along one side of the face of the vending machine is exemplary only and should not be construed as limited to this configuration. The user interface area 110 may be located along the left side of the face of the vending machine 100. Additionally or alternatively, the user interface area 110 may be located in any other user-accessible portion of the vending machine 100. While shown adjacent to each other, in other embodiments, subsections of the user interface 110 may be located in different portions of the vending machine 100.

Figure 1B:
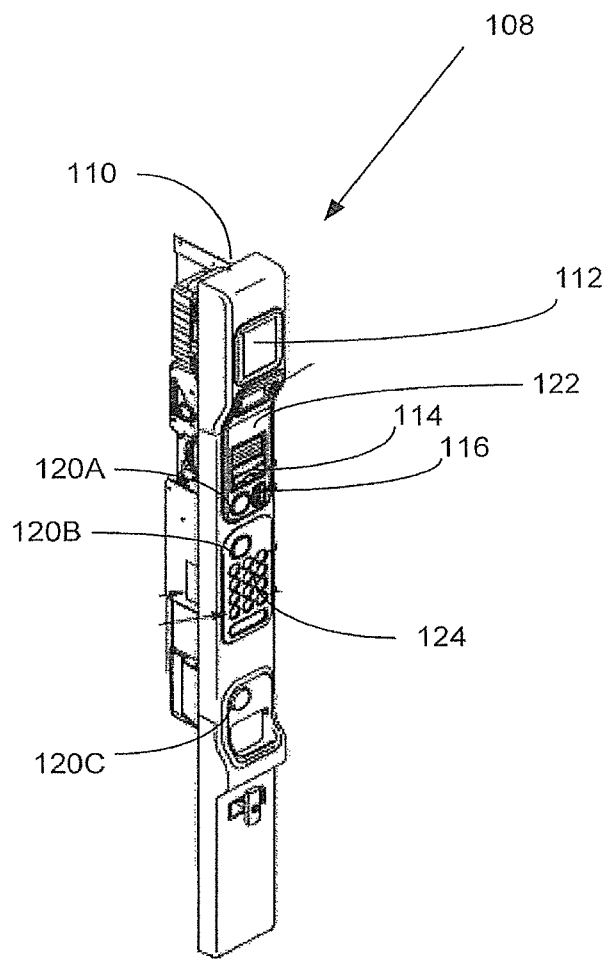
FIGS. 1b and 1c are somewhat simplified illustrations of a vending machine user interface according to one embodiment of the present disclosure.
Figure 1C:
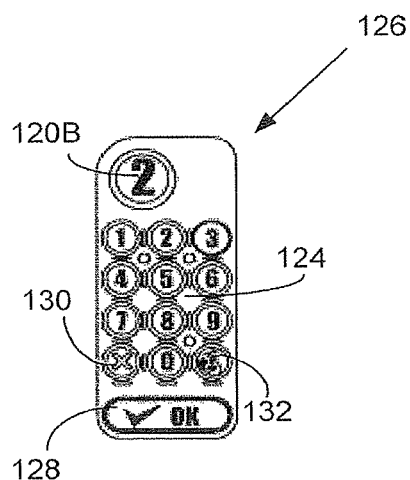

Referring now to FIGS. 1b and 1c, the user interface area (hereinafter "UI") 110 is disposed on a front face of a control carriage 108 (also referred to as a "monetary slide"). The UI 110 includes a card validator 112 (shown on FIG. 1a), a bill validator 114, and a coin insert 116. Although only these three monetary inputs are shown, it should be understood that any suitable manner and method of payment may be incorporated. The UI 110 also includes a user interface guide 220 (hereinafter "UI guide"). The UI guide 120 may be one (1) unit or may be separated into two (2) or three (3) units. The UI guide 120 includes a first position indicator 120A, a second position indicator 120B and a third position indicator 120C. The UI 110 may be a touch screen display or may include multiple touch screen displays. The first position indicator 120A is a visual Light Emitting Diode (hereinafter "LED") display. Use of an LED is exemplary and it should be understood that other light emitting sources, such as, but not limited to, incandescent, plasma and fiber-optic sources may be utilized. Different ones of the position indicators 120A, 120B and 120C may utilize different source technologies and display through different wavelength spectrums (i.e., the position indicators 120A, 120B and 120C may each appear to be a different color as light is emitted or reflected via a different wavelength).

The first position indicator 120A is located proximate to the monetary input elements (e.g., the card validator 112, the bill validator 114 and the coin insert 116). In some embodiments, the card validator 112, the bill validator 114, the coin insert 116 and the first position indicator 120A are contained within a first position area 122. The first position indicator 120A indicates a starting position for conducting a vending machine transaction. The first position indicator 120A is preferably located at or near the top of the UI 110. Alternatively, if the UI 110 is horizontally oriented, the first position indicator 120A may be located to the left of the second position indicator 120B for left to right reading languages. Alternatively, the first position indicator 120A may be located to the right of the second position indicator 120E in right to left reading languages.

The position indicators 120A, 120B and 1200 may display numerals or characters that indicate the sequence in which they are activated. In some embodiments, the first position indicator 120A may display the numeral "1", the second position indicator 120B may display the numeral "2", and the third position indicator 120C may display the numeral In other embodiments, the position indicators 120A, 1208 and 120C may display the characters "A", "B" and "C", respectively.

The first position indicator 120A is responsive to programming instructions (discussed in further detail herein below) such that the first position indicator 120A is illuminated prior to the insertion of money into any one of the card validator 112, the bill validator 114 and the coin insert 116. The first position indicator 120A may be responsive to programming to perform a flashing operation (i.e. an interchange of illumination and non-illumination in a specified sequence) prior to a user initiating a monetary transaction at the vending machine (e.g., insertion of a credit or debit card into the card validator 112, insertion of a bill or bills into the bill validator 114, and insertion of a coin or coins into the coin insert 116). In some embodiments, the first position indicator 120A may be in a steady-on state during idle. In other embodiments, the first position indicator 120A may cycle through two or more colors during idle. It will be understood that insertion of a card into the card validator 112 is exemplary. In other embodiments, the card validator 112 may be a touch-type validator that requires only a touch of the card. In still other embodiments, the card validator 112 may be a contactless validator capable of reading the card without any contact (e.g., optically or by radio frequency). In some embodiments, the card validator 112 may be capable of reading types of monetary cards other than debit and credit cards.

The second position indicator 120B is located proximate to a customer keypad 124. In some embodiments, the second position indicator 120B and the customer keypad 124 are included as part of a selection panel 126 as shown in FIG. 1c. In some embodiments, the second position indicator 120A emits (or reflects in additional and alternate embodiments) light in the same wavelength as a plurality of buttons within the customer keypad 124. In such embodiments, for example, if the plurality of buttons within the customer keypad 124 emit light of a wavelength of approximately 510 nanometers (nm) (i.e. appearing green), then the second position indicator 120A will be configured so as to emit light of a wavelength of approximately 510 nm. The second position indicator 120B indicates a product selection position for conducting a vending machine transaction. The second position indicator 120B is preferably located at or near a middle portion of the UI 110. The second position indicator 120B can be positioned to be below the first position indicator 120A when the UI 110 is vertically oriented. Alternatively, the second position indicator 120B may be located to the right of the first position indicator 120A for left to right reading languages. Alternatively, the second position indicator 120B can be located to the left of the first position indicator 120A in right to left reading languages.

The second position indicator 120B is responsive to programming instructions (discussed in further detail herein below) such that the second position indicator 120B is illuminated in response to the insertion of a minimum amount of money into any one or more of the card validator 112, the bill validator 114 and the coin insert 116. The second position indicator 120B may be responsive to programming instructions to perform a flashing operation (i.e. an interchange of illumination and non-illumination in a specified sequence) in response to the insertion of the minimum amount of money required to purchase at least one product for sale in the vending machine into any one or more of the card validator 112, the bill validator 114 and the coin insert 116. In some embodiments, the second position indicator 120B may be in a steady-on state in response to the insertion of the minimum amount of money required to purchase at least one product for sale in the vending machine. In other embodiments, the second position indicator 120B may cycle through two or more colors during idle.

The customer keypad 124 includes a plurality of buttons responsive to physical contact by the consumer. The customer keypad 124 may be a standard numeric keypad or it may be an alpha-numeric keypad. The buttons of the customer keypad 124 are adapted to be illuminated by LED or sources such as, but not limited to, incandescent light and fiberoptic. Each one of the plurality of buttons includes a character, or characters. In one embodiment, the character on each of the plurality of buttons is opaque while the remaining area of each of the plurality of button illuminates. In alternate embodiments, the character illuminates while the remaining area of the button is opaque. Additionally, the customer keypad 124 may be displayed within a touch screen display. In some embodiments, as stated herein above with reference to the second position indicator 120A, the plurality of buttons of the customer keypad 124 emit a light at a wavelength that is the same as the wavelength of light emitted by the second position indicator 120A. Further, the buttons of the customer keypad are configured to be of such a size and shape so as to assist a customer in readily recognizing and contacting each one of the plurality of buttons. For example, the buttons of the customer keypad 124 may be large round buttons as well as being illuminated.

The customer keypad 124 is responsive to programming such that, upon the initiation of a selection by the customer, the button, or the area representing the button if part of a touch screen display, illuminates and may remain illuminated. For example, if the customer presses a number on the customer keypad 124, the number is illuminated. The characters selected by the customer may remain illuminated until the customer confirms the selection (discussed herein below with respect to a "check OK" indicator). Additionally, the characters selected by the customer may be displayed on a video display 127.

In some embodiments, the video display 127 is a two inch (2") by three and a half inch (3.5") graphic display. The display 127 shows how much money has been entered and may have an internal program for idle periods. The display 127 provides a visual indication of which product identification characters have been entered. Upon entry of the last character of the product identifier, the display 127 directs the customer to press a "check OK" button 128. For example, if the product identifiers are three-digit numbers, upon entering the third number, the display 127 directs the customer to press the "check OK" button 128. Further, if a selected product fails to be dispensed, the display 127 directs the customer to make another selection.

After a last character of a product identifier is entered by the customer, the "check OK" indicator 128 flashes. The "check OK" indicator 128 is included as part of the customer keypad 124. In some embodiments, the "check OK" indicator 128 is located proximate the keypad area of the customer keypad 124. The "check OK" indicator 128 is responsive to programming such that, upon the customer physically contacting (e.g., pressing, touching) the "check OK" indicator 128, the vending machine 100 commences a vend process.

The customer confirms that the correct product identifier has been entered by pressing the "check OK" indicator 128. Thereafter, the vending machine activates a dispensing mechanism corresponding to the product identifier in order to release the selected product. As the product is released from a product tray, the product is deposited into a delivery bin (not illustrated in FIG. 1a). The product within the delivery bin is accessible via the delivery door 104.

If the customer determines that the correct product identifier was not entered, the customer may press (i.e. physically contact) a cancel key 130. The cancel key 130 is included within the customer keypad 124. In some embodiments, the cancel key 130 is located proximate the customer keypad 130 or in another location. The cancel key 130 is responsive to programming such that the cancel key 130 illuminates upon the entry of any character of a product identifier. Selection of the cancel key 130 removes the entry of the product identifier from a memory (discussed in more detail herein below) and from the display 127.

Additionally, prior to confirming the selection by depressing the "check OK" indicator 128, the customer may request that the vending machine 100 return the customer's money. The customer may request that the money inserted during the initiation of the transaction be returned by depressing a coin return key 132.

The coin return key 132 is included within the customer keypad 124. In some embodiments, the coin return key 132 is located proximate the customer keypad 130 or in another user-accessible location. The coin return key 132 is responsive to programming such that the coin return key 132 illuminates upon the entry of money into the coin insert 116. Selection of the coin return key 132 removes the entry of the product identifier from a memory, if entered (discussed in more detail herein below). Pressing the coin return key 132 causes the vending machine 100 to return any money inserted into the coin insert 116. In some embodiments, depressing the coin return key 132 results in the vending machine 100 cancelling the initiation of any transaction resulting from reading a debit or credit card at the card validator 112 or returning any bills inserted into the bill validator 114.

Upon a request by a customer to return money inserted into the coin insert 116, the third position indicator 120C illuminates. The third position indicator 120C is located proximate a coin return tray 134. The third position indicator 120C is responsive to programming (discussed in further detail herein below) such that the third position indicator 120C is illuminated in response to the return of money inserted into the coin insert 116. Alternatively, the third position indicator 120C can be responsive to programming to perform a flashing operation (i.e. an interchange of illumination and non-illumination in a specified sequence) in response to the return of money inserted into the coin insert 116.

Additionally, if the customer inserts more money than is required to purchase the desired product, the third position indicator 120C is responsive to programming such that the third position indicator 120C is illuminated when excess money (e.g., change from the sale) is returned to the customer. For example, the customer inserts one dollar ($1.00) and selects a product for sale at seventy-five (75) cents. In response, the product is dispensed, twenty-five (25) cents is placed in the coin return tray 134 and the third position indicator 120C is illuminated.

Figure 1D:
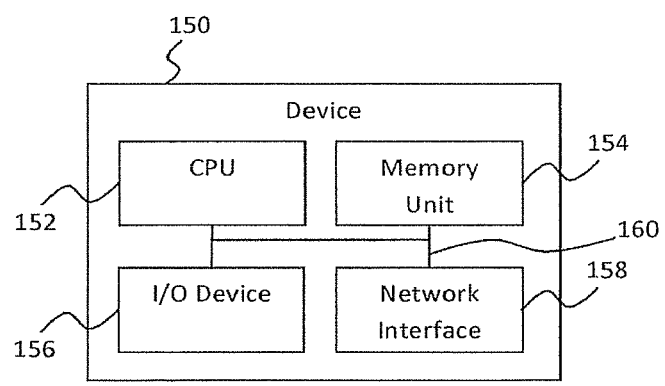
FIG. 1d is an somewhat simplified illustration of a vending machine controller according to one embodiment of the present disclosure.

Referring now to FIG. 1d, a somewhat simplified illustration of a vending machine controller 150 according to one embodiment of the present disclosure is depicted. One embodiment of the controller 150 that may be used to operate the UI guide 120 is illustrated. The device 150 may be a computer, or any other device capable of transmitting, processing, and/or receiving signals via wireless and/or wireline communication links. The device 150 includes central processing unit ("CPU") 152, a memory unit 154, an input/output ("I/O") device 156, and a network interface 158. The network interface may be, for example, one or more network interface cards (NICs) that are each associated with a media access control (MAC) address. The components 152, 154, 156, and 158 are interconnected by one or more communication links 160 (e.g., a bus). It is understood that the device 150 may be differently configured and that each of the listed components may actually represent several different components. For example, the CPU 152 may actually represent a multi-processor or a distributed processing system; the memory unit 154 may include different levels of cache memory, main memory, hard disks, and remote storage locations; and the I/O device 156 may include monitors, keyboards, and the like. Alternatively, single components may be utilized for two or more of the components illustrated.

Figure 4:
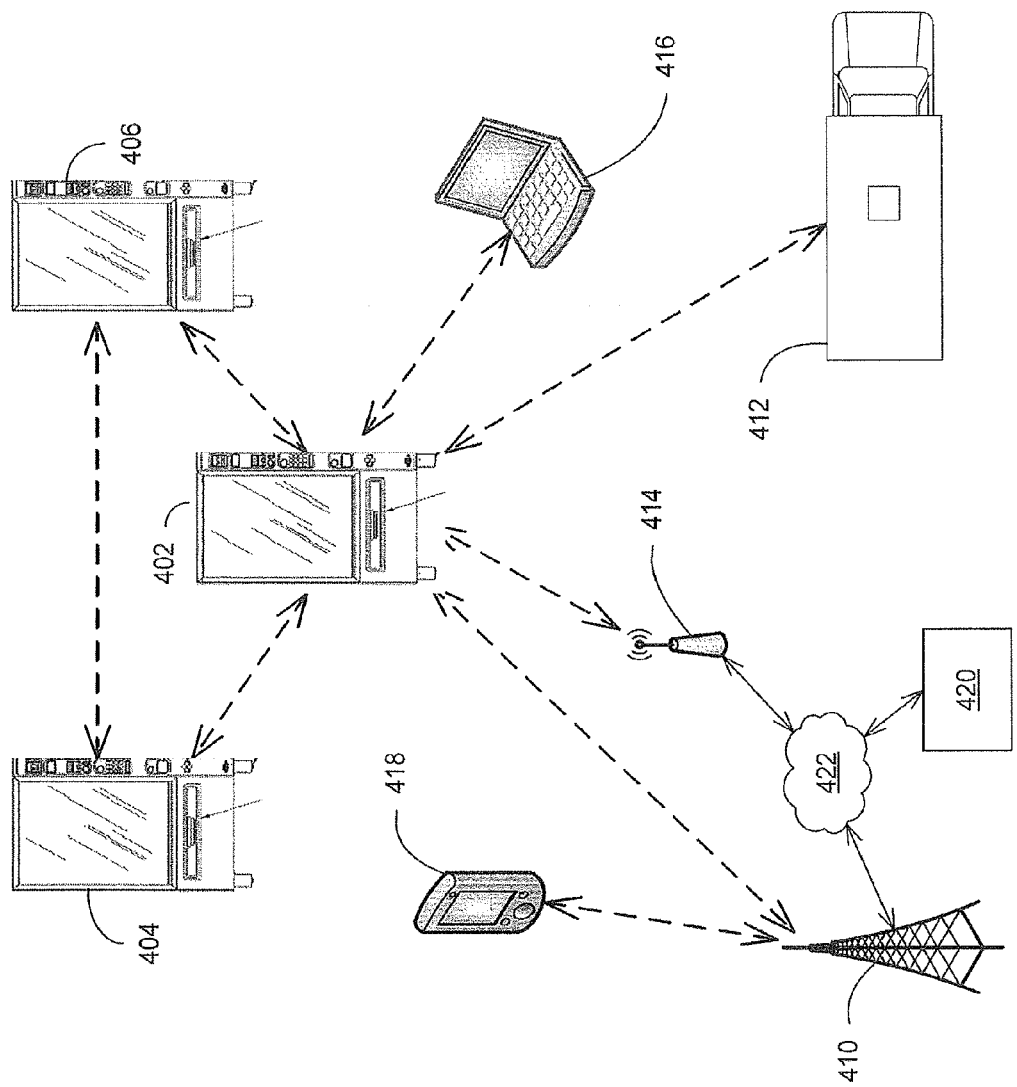
FIG. 4 is a schematic system diagram of a vending machine system having wireless communication capability according to one embodiment of the present disclosure.

The network interface 158 enables the device 150 to connect to a network, such as the wireless network of FIG. 4. Network connectivity may allow different functions of the vending machine 100 to be remotely operated or programmed. For example, remote programming transmitted through the network interface 158 may cause the video display 127 to display certain messages, such as promotional messages. As another example, the position indicators 120A-120C may be remotely programmed to change colors to reflect a holiday or event. Likewise, remote operation instructions transmitted through the network interface 158 may allow any or all of the card validator 112, the bill validator 114 and the coin insert 116 to be reset or reprogrammed. Similar functions may be available through I/O device 156.

Memory unit 154 contains programming instructions adapted to be utilized by the CPU 152 to direct the UI 110 through the operation of the functions of the first position indicator 120A, second position indicator 120B, third position indicator 120C, display 127, customer keypad 124, "check OK" indicator 128, cancel key 130, and coin return key 132. Memory unit 154 is further adapted to store inputs received from the customer keypad 124 for illustration of selected product via display 127 and illumination of depressed characters on customer keypad 124.

Figure 1E:
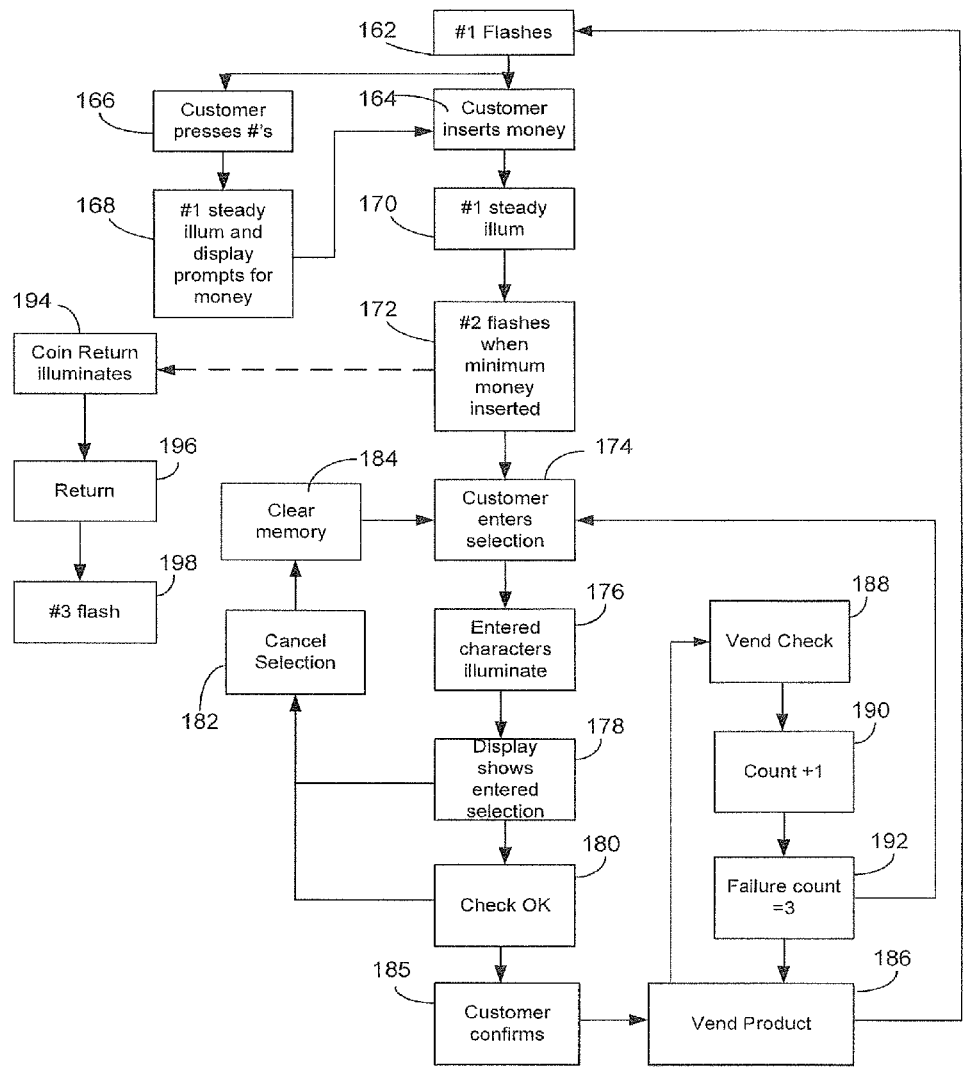
FIG. 1e is a flow chart of the operation of a user interface guide according to one embodiment of the present disclosure.

Referring now to FIG. 1e, a flow chart of the operation of the UI guide according to one embodiment of the present disclosure is illustrated. Flow starts at 162 wherein the first position indicator is flashing. In other embodiments the first position indicator 120A may be steady illuminated. In still other embodiments, the first, second and third position indicators 120A, 120E and 120C flash in a programmed sequence. In yet other embodiments, a visual cue is displayed by display 127 or the position indicators 120A-C so as to attract a prospective customer to make a purchase. In such embodiments, the visual cue can be an animation that is designed to attract the attention of potential consumers.

When a customer decides to make a purchase, the customer may begin by inserting in step 164 any one of a debit or credit card into the card validator 112, a dollar bill into the bill validator 114, and a coin into the coin insert 116. It will be understood that the value of the dollar bill is exemplary and that various embodiments provide for the insertion of currency in other amounts that can be detected and determined by the bill validator. Thereafter, the UI guide proceeds, in step 170, to steady illuminate the first position indicator 120A.

However, prior to insertion of money in step 164, the customer may proceed to press numbers on the customer keypad in step 166. In such scenario, the UI guide moves to step 168 wherein the first position indicator is illuminated and the display broadcasts a textual message indicating that the customer must first insert money prior to making a selection. The UI guide remains at this prompt until the customer inserts any one of a debit or credit card into the card validator 112, a dollar bill into the bill validator 114, and a coin into the coin insert at step 164.

Once the customer has inserted a minimum amount of money (or inserted a card into the card validator 112) to make a purchase of at least one product in the vending machine, the second position indicator 120B flashes in step 172. Thereafter, the customer is directed by the flashing second position indicator 120B and the display 127 to enter a product identifier via the customer keypad in step 174. The customer may continue to insert more money as required for the desired purchase, or the customer may proceed to make a selection by entering the product identifier. As the customer enters the product identifier, the character corresponding to the entered number is illuminated in step 176. For example, if the customer depresses a position on the customer keypad corresponding to the number "4", the character at the number "4" position on the customer keypad illuminates. Additionally, as the customer enters the product identifier, the characters entered are displayed in step 178 via the display 127. For example, if the customer depresses the product identifier "444", the customer keypad will illuminate the "4" character position. However, the product identifier "444" will be displayed via the display 127. As such, the customer will be able to visually verify that the number "444" was entered and not just the number "4".

After entry of a minimum numbers of characters necessary to identify a product for selection, the "check OK" indicator 128 is illuminated in step 180. The customer is thereby provided the opportunity to confirm that the product identifier corresponding to the desired product has been correctly entered.

If the customer determines that the incorrect product identifier was entered, or if the customer changes his/her mind about the desired purchase, the customer may depress the cancel key 130 in step 182. Thereafter, the entered product identifier is cleared from memory 154 in step 184 and the UI guide process returns to step 174 for entry of another product identifier.

If the customer determines that correct product identifier was entered, the customer depresses the "check OK" identifier 128 in step 185. Depressing the "check OK" identifier 128 confirms the selection and commences the vend process in step 186.

During the vend process, a vend sensing system in the vending machine 100 may indicate to the controller 150 that the selected product was not successfully dispensed. For example, the product may be stuck in the tray, or the dispensing mechanism corresponding to the product may be inoperative. The status of the vend sensing system may be checked in step 188. If the product is not provided to the customer, a count is incremented by one (1) in step 190. The process checks the number of failed attempts in step 192. If the number of failed attempts is less than three (3), the process returns to step 186 to attempt to vend the product again. If the number of failed attempts is three (3), the memory 154 is cleared of the product identifier, the customer is informed that the selected product is unavailable and the process returns to step 174 where the customer may enter another selection. It will be understood that three failures is exemplary and the vend process check maximum failures can be set to any specified number of failures.

However, if the vend process is successful, the customer is able to obtain the selected product. Thereafter, the UI guide process returns to the idle state at 162. Additionally, if change is returned to the customer because more money was deposited than required, the UI guide process transitions to step 196. In step 196, the change is deposited in the coin return tray 134 and the third position indicator 120C illuminates in step 198.

Additionally, anytime after the customer has inserted money into the coin insert 116, the coin return key 132 is illuminated and the customer is provided the capability of requesting that the inserted money be returned. The customer presses the coin return key 132 at step 194. Thereafter, the customer's money is returned in step 196 via the coin return tray 134. In some embodiments, the third position indicator 120C is illuminated to direct the customer to retrieve his/her money in step 198. If the customer inserted a credit card into the card validator 112, the third position indicator illuminates indicating that the transaction has been cancelled. If the customer inserted one or more bills into the bill validator 114, the third position indicator 120C and/or the display 127 may be set to indicate that the money is being returned as coins via the coin return tray 134 or as in currency via the bill validator 114.

Figure 2B:
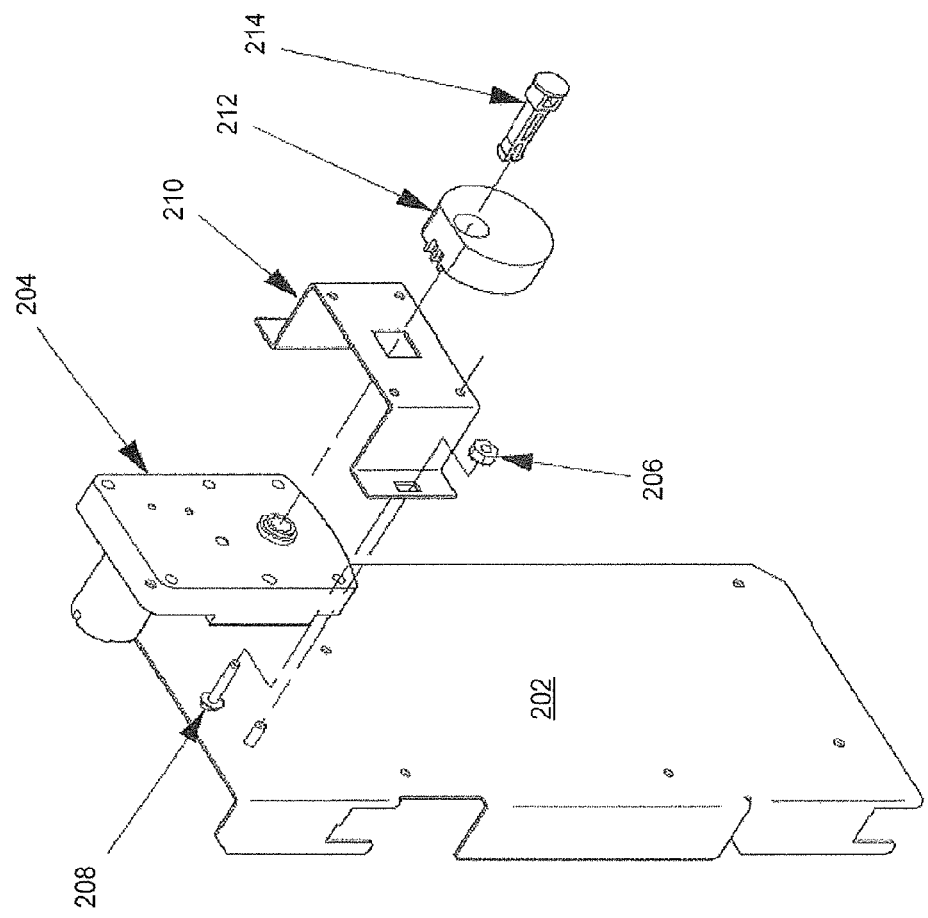
FIGS. 2a, 2b, and 2c depict a somewhat simplified vending machine coin return mechanism according to one embodiment of the present disclosure.
Figure 2A:
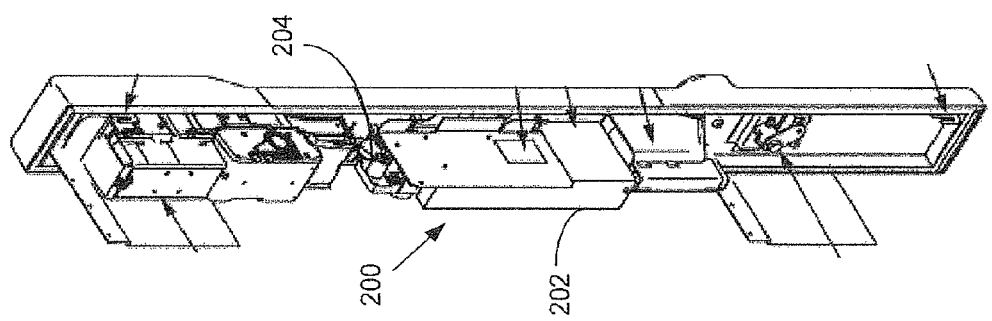
Figure 2C:
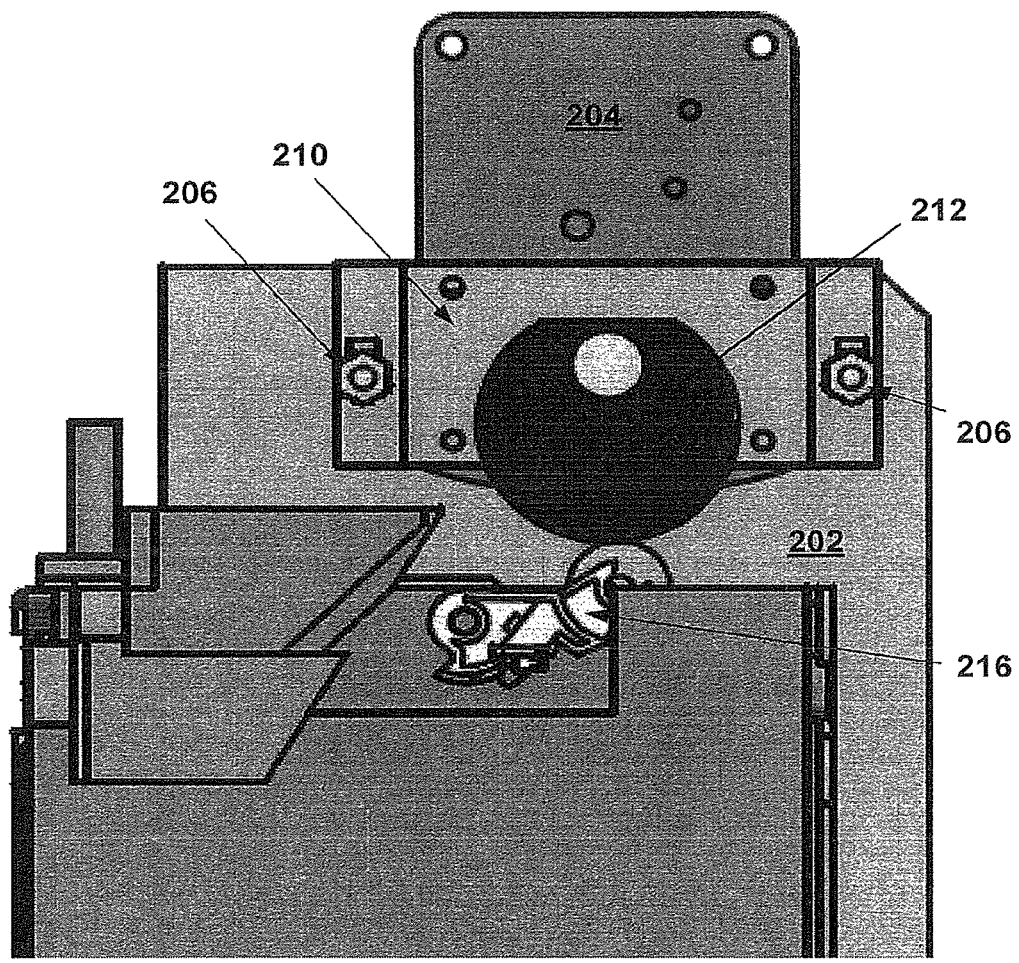

Referring now to FIGS. 2a, 2b, and 2c, a somewhat simplified electronic vending machine coin return system 200 according to one embodiment of the present disclosure is illustrated. The coin return system 200 is disposed within the control carriage 108. In one embodiment, the coin return system 200 is accessible for maintenance by sliding the control carriage 108 forward via rails attached to a housing of the vending machine 100.

The coin return system 200 comprises a coin receiving and dispensing mechanism 202. A coin return lever (or other actuator) 216 (shown in FIG. 2c) of the coin receiving and dispensing mechanism 202 is mechanically coupled to a coin return motor 204. The coin return motor 204 is electrically coupled to the controller device 150. The coin return motor 204 may be an electrically controlled actuator.

FIG. 2b depicts an exploded view of the coin receiving and dispensing mechanism 202 from another angle, according to one embodiment. FIG. 2c depicts an assembled view of the coin receiving and dispensing mechanism 202, according to one embodiment. The coin return motor 204 is held adjacent to the coin receiving and dispensing mechanism 202 by a bracket 210. The coin return motor 204 and the bracket 210 are secured to the coin receiving and dispensing mechanism 202 by one or more fasteners, such as screw 208. One or more nuts, such as nut 206, are configured to fit the screws, such as the screw 208. A cam 212 is coupled to the coin return motor by a cam coupling 214. In certain embodiments, the cam 212 is approximately an eccentric circle. In other embodiments, the cam 212 may be approximately elliptical or another shape. When the coin return motor 204 is activated, the cam 212 is driven by the coin return motor 204 to rotate about an axis substantially collinear with the cam coupling 214.

When a customer depresses the coin return key 132, the key press is detected by the controller device 150. In response to the detection, the controller device 150 sends a signal to activate the coin return motor 204. Activation of the coin return motor 204 rotates the cam 212, which presses the coin return lever 216, causing any coins contained within a holding tray of the coin receiving and dispensing mechanism 202 to be released via a path coupled to the coin return tray 134.

Although the embodiment of the coin return system 200 described above utilizes a motor and cam, such an embodiment is exemplary and is not limiting. It will be understood by those of skill in the art that other mechanisms are possible. For example, in another embodiment, the coin return system 200 may include a solenoid that is mechanically coupled to the coin return lever of the coin mechanism 202 and electrically coupled to the controller device 150. Upon receiving a signal from the controller device 150, an armature in the solenoid may move to press the coin return lever of the coin mechanism 202, thus releasing the coins in the holding tray of the coin mechanism.

Figure 3A:
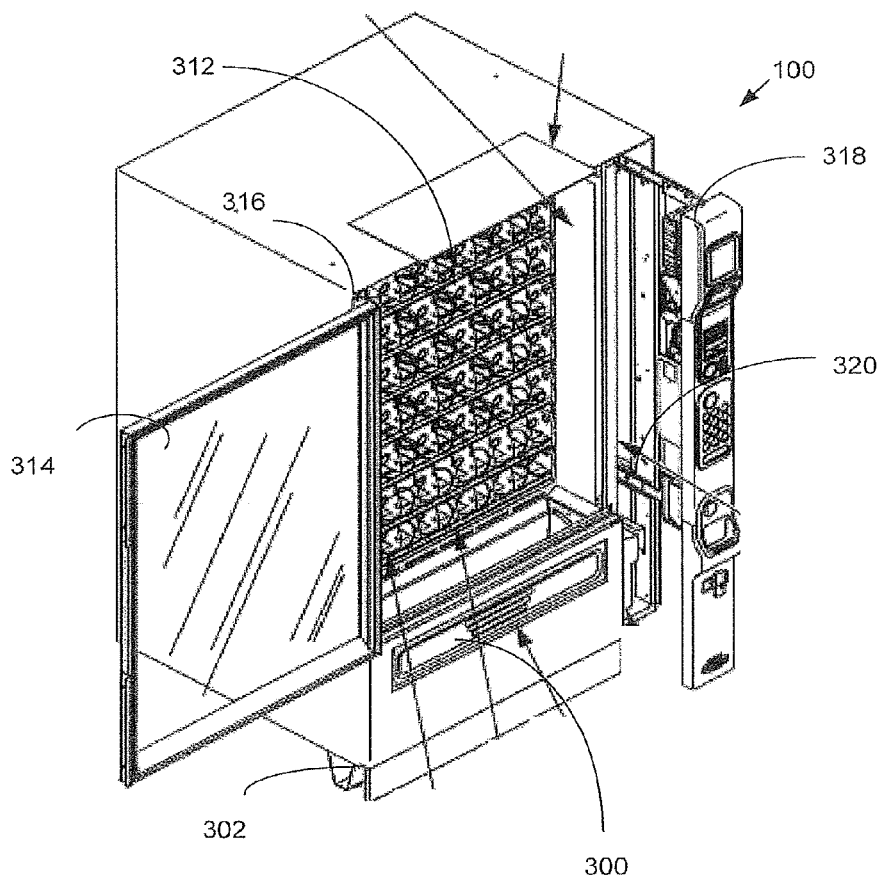
FIGS. 3a, 3b, and 3c illustrate a hinged delivery bin for a vending machine according to one embodiment of the present disclosure.
Figure 3B:
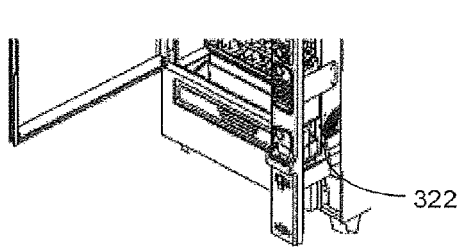
Figure 3C:
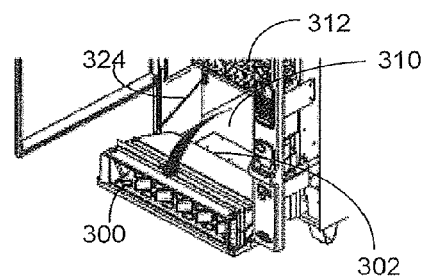

Referring now to FIGS. 3a, 3b and 3c, a delivery bin 300 for the vending machine 100 according to one embodiment of the present disclosure is depicted. The delivery bin 300 is coupled to a housing of the vending machine 100 via a hinged joint 302. The hinged joint 302 is located on the bottom edge of the front of the delivery bin 300. The hinged joint 302 couples the delivery bin 300 to a bottom front edge of the housing of the vending machine 100.

The vending machine 100 includes a bin storage area 310. The bin storage area 310 is located beneath a lowermost product display trays 312. The bin storage area 310 is accessible by rotating the delivery bin 300 about the hinged joint 302.

A door 314 coupled to the housing of the vending machine 100 via a hinged joint 316 provides access to the product display trays 312. The hinged joint 316 is located on a vertical edge of the door 314. The hinged joint 316 couples the door 314 to a portion of a vertical front edge of the vending machine 100 housing.

The UI 110 is disposed on the face of a control carriage 318. The control carriage 318 is attached to the housing of the vending machine 100 via a glide assembly 320. The glide assembly 320 enables the control carriage 318 to slide forward, outward from the housing of the vending machine 100. Sliding the control carriage 318 provides access to internal components of the UI 110, money collected by the vending machine 100, and a delivery bin latching mechanism 322.

The delivery bin latching mechanism 322 is an interlock that secures the delivery bin 300 in an upright, i.e., dispensing position. In certain embodiments, a user wishing to open the delivery bin 300 first opens the door 314, slides the control carriage 318 forward, and then operates the delivery bin latching mechanism 322 to tilt the delivery bin 300 downward. Support control rods 324 coupled to the side of the delivery pan assembly 300 provide support when the delivery bin 300 is in the open (down) position.

The delivery bin 300 requires a specified depth in order to receive, contain, and provide subsequent access to, products vended for consumers. Previously, a delivery bin was attached to the door (for example door 314) and swung out with the opening of the door. The delivery bin door 104 is located on the face of delivery bin 300 to provide access to the vended products. Rotation of the delivery bin 300 downward (i.e., locating the hinge joint 302 at the bottom edge of the delivery bin 300), results in the elimination of a side rotation radius that would have been required had the hinge joint 302 been located on a vertical side of the delivery bin 300. For example, if the hinge joint 302 were located on the same vertical side as the hinge joint 316, opening the delivery pan assembly 300 would require additional space along the side adjacent the control carriage 318 to allow for the depth of the delivery bin 300 to rotate out of the vending machine 100 housing. The product displays trays 312 are set back within the vending machine 100 housing to allow for a product released from the product display trays 312 to drop into the delivery bin 300. The set back of the display trays 312 provides sufficient clearance for the delivery bin 300 to rotate downward without adjusting the exterior dimensions of the vending machine 100 housing.

Referring to FIG. 4, vending machines 402, 404 and 406 according to the present disclosure communicate wirelessly with each other. In one embodiment, the vending machines 402, 404 and 406 are located adjacent to each other and only the machine 402 has a user interface: e.g., coin/currency acceptor and/or dispenser mechanisms, selection buttons, and display apparatus. A user may select a product located in the vending machine 404 by operating the selection buttons on the machine 402 and the machine 402 will send a wireless message to the machine 404 to cause the machine 404 to dispense the product. Where the machine 404 has a product delivery sensing system, the machine 404 may send a wireless message to the machine 402 indicating whether the product was successfully vended, and the machine 402 may offer the opportunity to select another product or return the customer's money.

The vending machines 402, 404 and 406 may exchange setup information via wireless messages. Such setup information may include numbers of shelves, numbers of product queues on each shelf, numbers of products in each queue, product price for each product queue, or other information. In an embodiment where only one machine has a user interface, such setup information may enable that machine to provide menu and selection choices for products in the other machines.

The machines 402, 404 and 406 may exchange operational status information via wireless communication. Such operational status information may include current inventory in each product queue, cumulative count of number of activations of a product queue dispenser, time since last servicing call, required maintenance, detected electronic or mechanical failures, or other information.

Other devices may additionally or alternatively communicate wirelessly with one or more of the vending machines 402, 404 and 406. A portable computer 416 communicates wirelessly with the machine 402 and may be used by a technician to provide setup information when the vending machines 402, 404 and/or 406 are installed, reconfigured or restocked. A technician in a service van 412 communicates wirelessly with the machine 402 from outside the building where the machine is located to determine whether service on one or more of the machines 402, 404 and 406 is required and, if so, what kind of service. A technician may also communicate wirelessly with the machine 402 to check operational status, such as whether the electronic coin return system 200 is performing correctly, or whether the delivery bin 300 is securely latched into an upright position.

Where the facility in which the vending machines 402, 404 and 406 are located has a wireless access point 414, the machine 402 communicates wirelessly through the access point 414 to a device 420 coupled to the access point 414 via a network 422 (e.g., Internet or another communication network). The device 420 may be a remotely located central server or other controller for an operator of a number of such vending machines. Through the use of a device 420, the operator may achieve a benefit such as avoiding the cost of sending a technician to the location of the vending machines 402, 404 and 406 to obtain operational status information.

In some embodiments, the vending machine 402 is capable of cellular communication. In such embodiments a personal digital assistant (PDA) 418 or other cellular-capable device may "call" the machine 402 at its cellular phone number to establish wireless communication via a base station 410 in order to send setup information or receive operational status information. Similarly, the base station 410 may be coupled to the network 422, allowing the device 420 to communicate with the vending machine 402 via the base station 410.

The wireless communication between the vending machine 402 and any one or more of the portable computer 416 the wireless access point 414, and the vehicle 412 may use the IEEE 802.11 standard (referred to as a "WiFi standard"), the IEEE 802.16 standard (referred to as a "WiMAX standard"), or any other suitable wireless communications interface standard. The machines 402, 404 and 406 may form a wireless ad hoc network or other mesh network. In other embodiments, communication between the vending machine 402 and the base station may be conducted under another standard than a cellular wireless standard.

While only the vending machine 402 is shown communicating wirelessly with the portable computer 416 the wireless access point 414, and the vehicle 412, it will be understood that any or all of the machines 402, 404 and 406 may provide such communication. In embodiments where setup and/or operational status information are located in the machine 402, another machine, such as vending machine 406, may provide wireless communication to an external device, such as the portable computer 416. In such an embodiment, status information is wirelessly communicated from the machine 402 to the machine 406 and then wirelessly communicated to the portable computer 416. Similarly, setup commands and information are wirelessly communicated from the portable computer 416 to the vending machine 402 and then wirelessly communicated to the machine 402.

In some embodiments, an operator may purchase product inventory to stock in the vending machines. In other embodiments, an operator may purchase and install machines that a manufacturer or other entity uses for consignment sales. Where such consignment products have a high price, cash sales may be impractical and the vending machine may be equipped with a card reader to scan credit or debit cards to fund the transaction. In such embodiments, the vending machine uses wired or wireless communication to communicate with a transaction network, independent sales organization, acquiring bank, or other entity to authorize the transaction.

It may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. The term "controller" means any device, system, or part thereof that controls at least one operation. A controller may be implemented in hardware, firmware, software, or some combination of at least two of the same. The functionality associated with any particular controller may be centralized or distributed, whether locally or remotely.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A vending machine, comprising:
   a cabinet holding a plurality of product shelves;
   a cabinet door enclosing a portion of a front of the cabinet and movable from a closed position to allow access to the product shelves; and
   a delivery bin assembly rotatably mounted within the cabinet, the delivery bin assembly including a front face, wherein a portion of the front face of the delivery bin assembly includes a delivery bin door configured to provide access to the product receiving area,
   wherein the delivery bin assembly is configured to tilt outward from the cabinet to permit access to a portion of the cabinet behind the delivery bin assembly, and wherein the front face of the delivery bin assembly extends below the cabinet door when the delivery bin assembly is not rotated outward from the cabinet and the cabinet door is in the closed position.

2. The vending machine according to claim 1, wherein the door bin door is configured to provide access through the front face of the delivery bin assembly into the product receiving area while the delivery bin assembly is not rotated outward from the cabinet.

3. The vending machine according to claim 1, wherein a storage area behind the delivery bin assembly is accessible when the delivery bin assembly is rotated outward from the cabinet.

4. The vending machine according to claim 1, further comprising:
a latching mechanism configured to secure the delivery bin assembly in an upright position within the cabinet.

5. The vending machine according to claim 4, wherein the latching mechanism is accessible when a control carriage is slid forward from the cabinet.

6. The vending machine according to claim 4, wherein the delivery bin door moves with the delivery bin assembly when the delivery bin assembly is rotated.

7. A vending machine, comprising:
a cabinet forming an enclosure; and
a delivery bin assembly rotatably mounted within the cabinet, the delivery bin assembly including
a front face,
a delivery bin mounted to the front face, and
a delivery bin door within the front face,
wherein the delivery bin assembly is rotatable between an upright position within the cabinet and an open position in which the delivery bin assembly is rotated outward from the cabinet to access to a storage area within the cabinet behind the delivery bin assembly when the delivery bin assembly is in the upright position, and
wherein the front face of the delivery bin assembly extends below a cabinet door enclosing a portion of a front of the cabinet when the delivery bin assembly is not rotated outward from the cabinet and the cabinet door is in a closed position.

8. The vending machine according to claim 7, wherein the delivery bin door moves with the delivery bin assembly when the delivery bin assembly is rotated from the upright position to the open position.

9. The vending machine according to claim 7, wherein the storage area behind the delivery bin assembly is accessible when the delivery bin assembly is in the open position, but is not accessible when the delivery bin is in the upright position.

10. The vending machine according to claim 7, further comprising:
a plurality of product shelves mounted within the cabinet above the delivery bin assembly, wherein products are delivered between the product shelves and the cabinet door to the delivery bin.

11. The vending machine according to claim 7, further comprising:
a hinged joint disposed along a bottom edge of the front face of the delivery bin assembly.

12. The vending machine according to claim 7, further comprising:
a latching mechanism configured to secure the delivery bin assembly in the upright position.

13. The vending machine according to claim 12, further comprising:
a control carriage slidably mounted to the cabinet and movable between a retracted position in which the control carriage is within the cabinet and an extended position in which the control carriage protrudes from the cabinet,
wherein the latching mechanism is accessible when a control carriage is in the extended position.

14. A method of mounting a delivery bin within a vending machine, the method comprising:
rotatably mounting a delivery bin mounted within a cabinet forming an enclosure, the delivery bin assembly including
a front face, and
the delivery bin mounted to the front face,
wherein the delivery bin assembly is rotatable between an upright position within the cabinet and an open position in which the delivery bin assembly is rotated outward from the cabinet to permit access to a storage area within the cabinet behind the delivery bin assembly when the delivery bin assembly is in the upright position; and
providing a delivery bin door within the front face, wherein the delivery bin door is configured to permit access to the delivery bin when the delivery bin assembly is in the upright position, and
wherein the front face of the delivery bin assembly extends below a cabinet door enclosing a portion of a front of the cabinet when the delivery bin assembly is not rotated outward from the cabinet and the cabinet door is in a closed position.

15. The method according to claim 14, further comprising:
configuring the delivery bin door to move with the delivery bin assembly when the delivery bin assembly is rotated from the upright position to the open position.

16. The method according to claim 14, wherein the storage area behind the delivery bin assembly is accessible when the delivery bin assembly is in the open position, but is not accessible when the delivery bin is in the upright position.

17. The method according to claim 14, further comprising:
mounting a plurality of product shelves within the cabinet above the delivery bin assembly, wherein products are delivered between the product shelves and the cabinet door to the delivery bin.

18. The method according to claim 14, further comprising:
disposing a hinged joint along a bottom edge of the front face of the delivery bin assembly.

19. The method according to claim 14, further comprising:
providing a latching mechanism configured to secure the delivery bin assembly in the upright position.

20. The method according to claim 19, further comprising:
providing a control carriage slidably mounted to the cabinet and movable between a retracted position in which the control carriage is within the cabinet and an extended position in which the control carriage protrudes from the cabinet,
wherein the latching mechanism is accessible when a control carriage is in the extended position.

* * * * *